United States Patent [19]
Little

[11] Patent Number: 5,857,285
[45] Date of Patent: Jan. 12, 1999

[54] STORAGE DEVICE FOR HOOKS AND LEADERS

[76] Inventor: Joe Little, 1941 Bishop Rd., Chehalis, Wash. 98532

[21] Appl. No.: 787,980

[22] Filed: Jan. 22, 1997

[51] Int. Cl.⁶ .................................................. A01K 97/06
[52] U.S. Cl. .................... 43/57.1; 206/315.11; 242/402; 242/405; 242/137.1
[58] Field of Search ...................................... 43/57.1, 57.2; 242/388, 402, 405, 405.3, 137.1; 206/389, 402, 315.11

[56] References Cited

U.S. PATENT DOCUMENTS

| 1,817,562 | 8/1931 | Hodge . | |
|---|---|---|---|
| 1,850,074 | 3/1932 | Crandall . | |
| 2,517,866 | 8/1950 | Glahn . | |
| 2,517,867 | 8/1950 | Glahn . | |
| 2,585,327 | 2/1952 | Johnson et al. . | |
| 2,763,957 | 9/1956 | Roberts | 43/57.1 |
| 3,039,226 | 6/1962 | Bagdonas | 43/57.2 |
| 4,036,451 | 7/1977 | Pipkin . | |
| 4,200,249 | 4/1980 | Synstelien et al. . | |
| 4,563,834 | 1/1986 | Spencer . | |
| 4,702,035 | 10/1987 | Palm | 43/27.1 |
| 4,813,173 | 3/1989 | Abbotoy . | |
| 4,862,635 | 9/1989 | Conte . | |
| 4,942,691 | 7/1990 | Hwang . | |

*Primary Examiner*—Jack W. Lavinder
*Attorney, Agent, or Firm*—Jensen & Puntigam, P.S.

[57] ABSTRACT

A closed cylindrical storage device for fishing hooks and attached leaders wherein a hollow spool is captured within an outer shell. The hollow spool is divided into sections for containing the hook, and the leaders extend through gates and are wound about the exterior of the spool as dictated by the individual gate. Relative rotation between the spool and its exterior shell is limited to one direction.

4 Claims, 3 Drawing Sheets

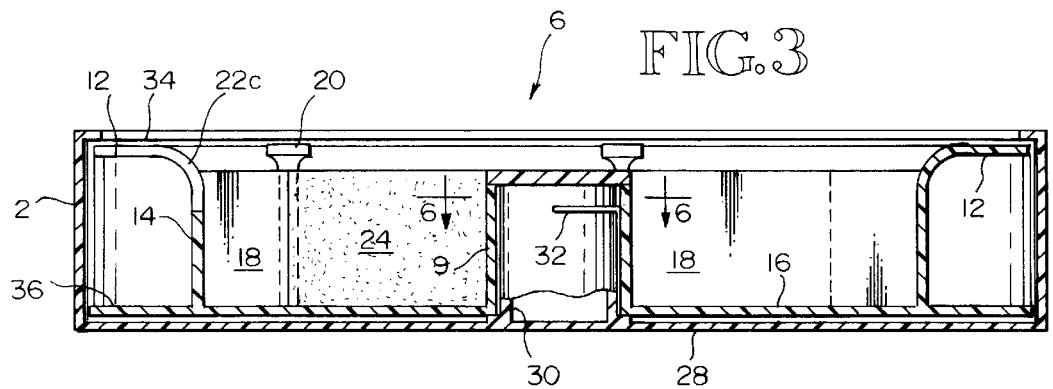
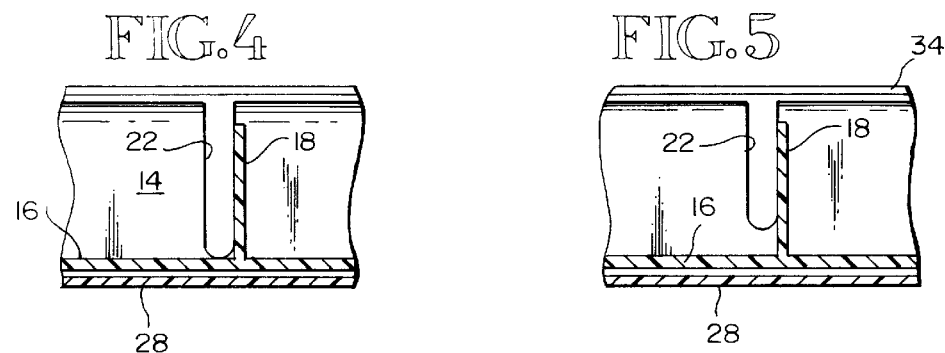
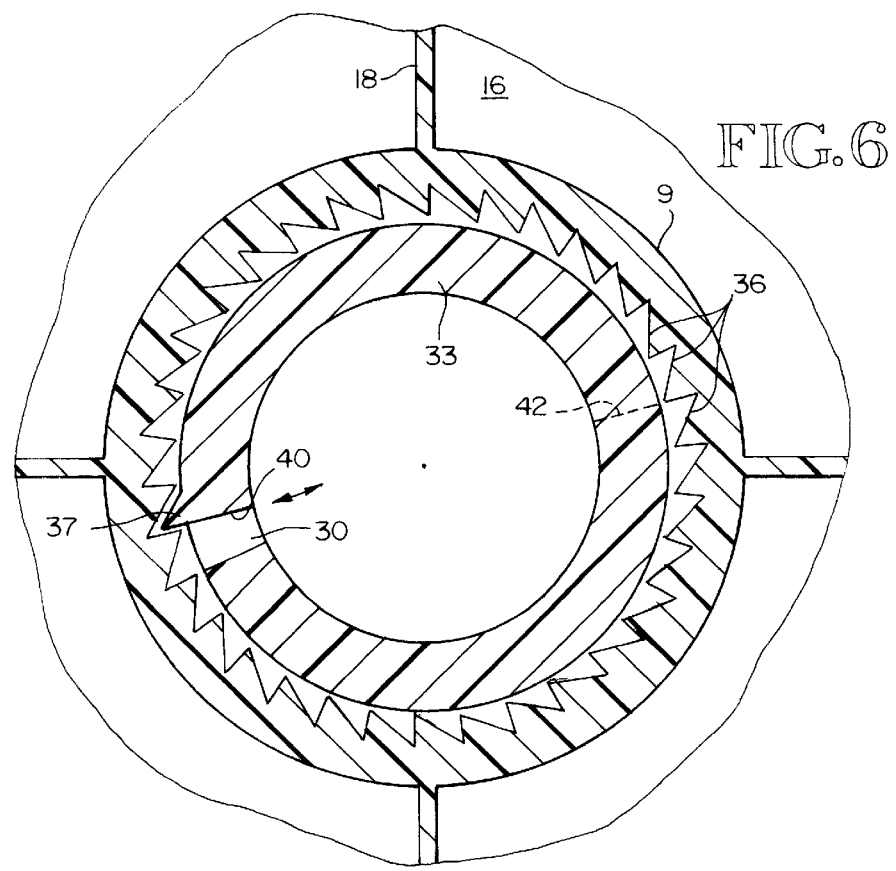

STORAGE DEVICE FOR HOOKS AND LEADERS

TECHNICAL FIELD

This invention relates to a device for storing and dispensing hooks, along with their pre-attached leaders. More particularly, the invention relates to a small, easily carried device wherein a plurality of hooks may be stored in individual compartments and their leaders wound around the exterior of the device, defining the compartments without tangling, and enabling the user to quickly and easily remove a hook and leader of choice without fear of tangling the remaining leaders.

BACKGROUND OF THE INVENTION

The need for a convenient, easy to use, small storage device for pre-tied hooks and leaders has long been recognized. The storage container needs to be small enough to be easily carried upon the person, capable of storing a plurality of hooks and leaders and constructed such that an individual hook and leader can be extracted without disturbing the remaining hooks and leaders.

The storage device for hooks and leaders must be capable of ease of use in adverse conditions such as poor light and chill without compromising the underlying purpose of supplying a plurality of pre-tied hooks very quickly.

Previous attempts at storage containers similar in purpose or construction to the present invention include U.S. Pat. No. 1,817,562 to Hodge, Aug. 4, 1931, which discloses a storage device for flies or the like which is in the form of a closed, relatively flat cylinder divided by radially extending walls but with no provision for winding leader.

U.S. Pat. No. 1,850,074 granted to Crandall, Mar. 22, 1932, discloses a cylindrical container having a rotatably mounted spool for fish lines, as well as a central divided storage compartment but provides means for selectively removing a line secured to a hook or the like without tangling the line.

U.S. Pat. Nos. 2,517,866 and 2,517,867 to Glahn, Aug. 8, 1950, discloses a multi-compartment, short cylindrical device for storing items such as fish lures, as well as a plurality of strands of leader material wrapped in separate coaxial spools within a unitary container.

U.S. Pat. No. 2,585,327 to Johnson et al, Feb. 12, 1952, discloses a dispensing reel for fishing leaders including a hollow disk including a plurality of radially dispersed tongues forming a reel tube placed within a container.

U.S. Pat. No. 4,036,451 to Pipkin, Jul. 19, 1977, discloses a hook and leader storage device wherein the hooks are stored in the center of the spool-like device upon which the leader is wound, the spool is mounted for rotation within a closed, cylindrical shell.

U.S. Pat. No. 4,200,249 granted to Synstelien et al, Apr. 29, 1980, discloses a storage device for fishing leader and other accessories, including a bobbin having a brake and an extended storage container for securement to the wearer's belt or the like.

U.S. Pat. No. 4,563,834 to Spencer, Jan. 14, 1986, discloses a container for fishing tackle including a cylindrical device for containing flies or the like in several segmented section of an elongated cylinder and a place for storing fishing leader at one end of the cylinder.

U.S. Pat. No. 4,702,035 to Palm, Oct. 27, 1987, discloses a storage container including a central portion having posts for storing the bulky end of a device secured to a flexible member which is then wound around the exterior of the cylindrical center section.

U.S. Pat. No. 4,813,173 to Abbotoy, Mar. 21, 1989, discloses a fishing lure container comprising a plurality of open ended cylinders contained within a larger master cylinder for storing fishing lures or the like. There is a provision for rotation for dispensing.

U.S. Pat. No. 4,862,635 to Conte, Sep. 5, 1989, discloses a snelled fishhook case which includes a cylindrical inner portion having radial wall upon which a hook can be placed and then the leader wrapped around the exterior. A cylindrical container and caps are likewise provided, and there is provision for axially joining more than one container.

U.S. Pat. No. 4,942,691 to Hwang, Jul. 24, 1990, discloses a cylindrical fishline storage box which includes a hollow cylinder for storage and magnetic plate for securing the hooks.

DISCLOSURE OF THE INVENTION

With the above-noted prior art in mind, it is an object of the present invention to provide a storage container for fishing hooks and their attached leaders, wherein a plurality of hooks may be conveniently stored and selectively removed without the danger of tangling the leaders.

It is another object of the present invention to provide a storage container for hooks and attached leaders which is compact in size, easy to use and very difficult to misuse.

A further object of the present invention is to provide a storage container for multiple hooks and attached leaders, wherein the removal of the hook and attached leader is quick and simple and can be accomplished under adverse conditions.

Still a further object of the present invention is to provide a cylindrical storage container for fishing hooks and attached leaders which includes a central subdivided storage compartment for a plurality of hooks and a cylindrical containment wall for supporting the attached leaders, all of which is contained within an exterior shell including a cover which is closed to capture the hooks and leaders.

Yet a further object of the present invention is to provide a storage device for hooks and attached leaders consisting of a spool or reel within a cylindrical container wherein the spool or reel is limited to rotation in one direction with respect to The container.

Another object of the present invention is to provide guidance means within a storage container to direct items to be wound upon a spool to a predetermined location on the spool.

BRIEF DESCRIPTION OF THE DRAWINGS

FIG. 3 is a vertical section along lines 3—3 of FIG. 2.

FIG. 4 is a vertical section along lines 4—4 of FIG. 2.

FIG. 5 is a vertical section along lines 5—5 of FIG. 2.

FIG. 6 is an enlarged section taken along lines 6—6 of FIG. 3.

BEST MODE FOR CARRYING OUT THE INVENTION

Figure 1:
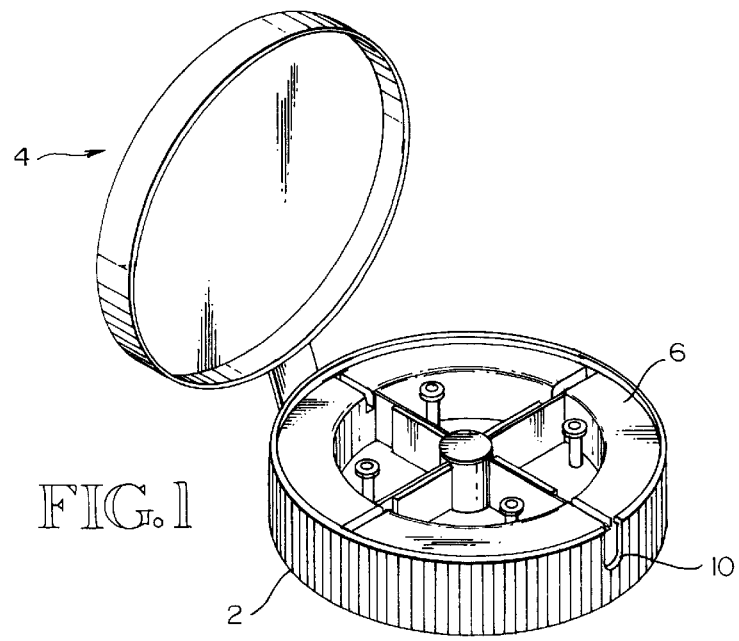
FIG. 1 is an isometric view of the inventive container with the lid open.

As seen in FIG. 1, the inventive storage container for hooks and attached leaders includes an exterior shell 2, including a hinged cover for containing a centrally located spool 6 having a central hub 8, and as explained hereinafter a plurality of dividers, posts and upwardly open gates. It is to be further noted that the exterior shell 2 includes an axially directed slot 10 which extends from its upper edge to allow removal of leaders stored on the spool.

Figure 2:
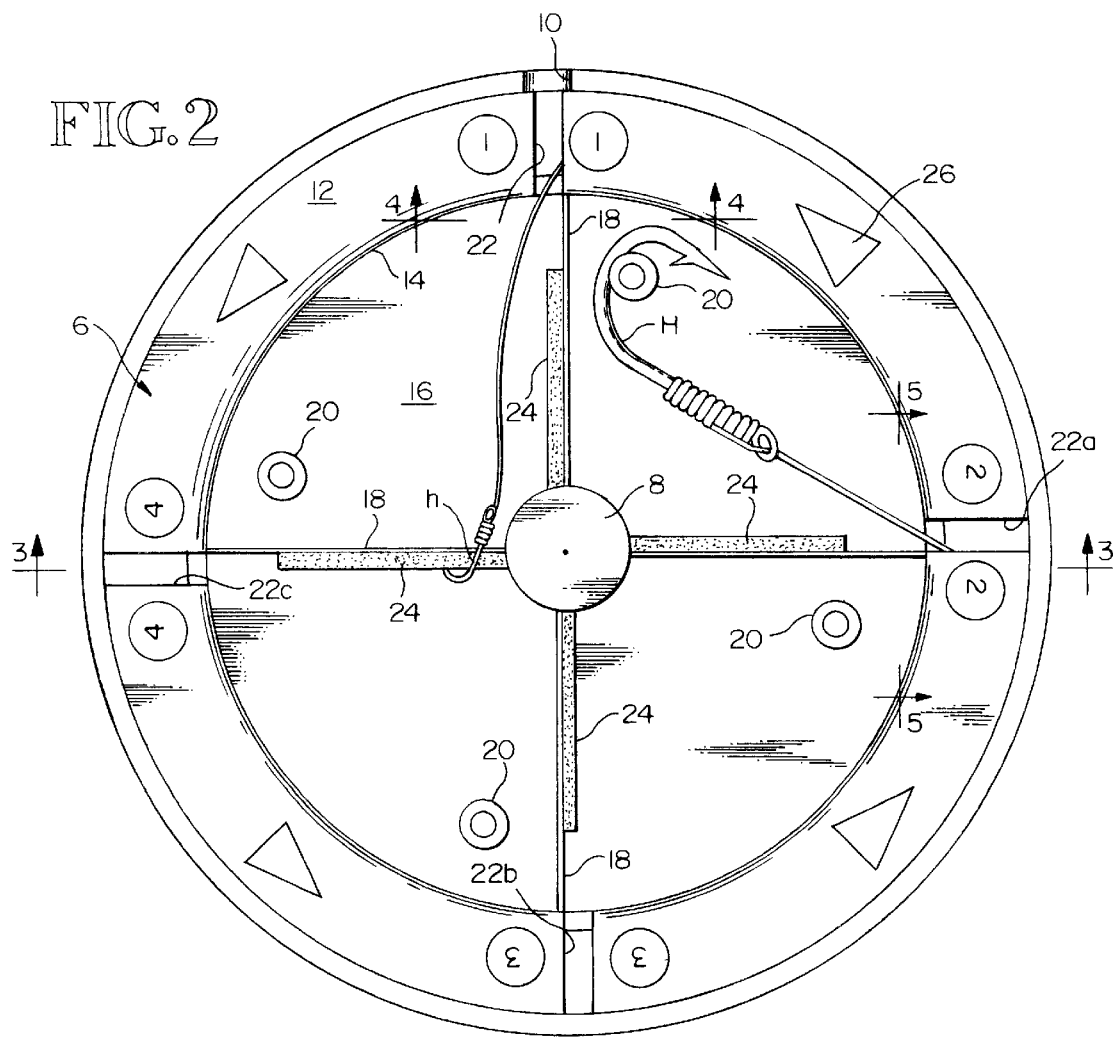
FIG. 2 is a top plan view of FIG. 1, with the lid removed.

Reference is now had to FIG. 2, wherein the exterior shell 2 and its axial slot 10 may readily be seen. The spool generally designated as 6 includes, as described in greater detail hereinafter, an upper flange 12 and a cylindrical axial wall 14 surrounding and spaced from the hub 8. The bottom of cylindrical wall 14 is closed by floor 16 and is divided into four or more compartments by radial dividers 18 which extend from the hub 8 to the cylindrical wall 14. Mounted within each of the sections formed by the cylindrical wall 14, floor 16 and divider 18 is a vertical hollow post or peg 20, for reasons to be explained hereinafter, and adjacent each of the walls 18 within each of the sections is a gate 22, 22A, 22B, 22C, which as can be seen in FIGS. 4 and 5 include a vertical component extending partially down to the wall 14 and the full width of upper flange 12, such that when a particular gate is in line with slot 10, the hooks and their attached leaders may be readily removed from the storage container. Further to be seen in this view are cork elements for securement of small hooks. As will be explained hereinafter, the reel is limited to rotation in only one direction about the hub, as illustrated by the printed arrows 26, such that the wound leaders will not get tangled during storage and removal. Also, as seen in this view, the pegs or posts 20 are hollow, such that an elongated item such as a pen or pencil may be inserted into them for rapid rotation of the reel for winding leaders. A large hook "H" is shown with its shank around the post 20 with its leader extending to the exterior of cylindrical wall 14 for wrapping therearound, as explained hereinafter, and a small hook "h" is shown embedded in the corkboard, and again with its leader extending to the exterior of the spool where it is wound.

Referring now to FIG. 3, it can be seen that the exterior cylindrical shell or casing 2 includes a solid floor 28 and an upwardly extending hollow stub axle 30 at the axis of vertical facing wall 2. It is to be noted that the hollow stub axle includes a horizontal cut 32 for reasons to be explained hereinafter. Likewise to be noted in this figure is a radially inwardly projecting lip 34 at the upper edge of the cylindrical wall 2 to capture the spool 6. As seen in this view, the cylindrical wall 14 curves outwardly and terminates in the flange 12 which is captured beneath inwardly projecting rim 34, keeping the spool 6 from accidentally dislodging. The stub axle 30 is slightly longer than the cavity end of hub 8, such that when assembled the floor 16 of the spool 6 does not contact the floor 28 of the case or shell 2 but primarily rests on top of the stub axle 30.

As seen in FIG. 4, the gate 22 extends clear to the bottom of wall 4, whereby leaders that pass through gate 22 tend to be wrapped around the bottom of the spool 6, exterior of the wall 14, and captured between the lower flange 36 of spool 6, wall 14, shell 2 and upper flange 12.

As seen in FIG. 5, which is the opening for gate 22a, the gate 22a does not extend to the bottom of wall 14, thus guiding the leader to a separate portion of the exterior of the spool. Likewise gates 22b and 22c terminate at different heights along wall 14 guiding the lines to separate sections of the reel 6.

As seen in FIG. 6, the one-way rotation is accomplished by the fact that the interior of the sidewalks 9 of hub 8 includes a plurality of swath notches and the upper portion 33 of stub axle, 30 as defined by cut 32, includes an outwardly projecting tooth 37 substantially congruent in exterior configuration to the swath notches 36. The matching sloping portions of notches 36 and tooth 37 are such that there is only one way that the relative rotation may occur, since the reverse rotation will cause 37 to be further driven into 36, preventing motion. The inward and outward flexibility of the upper unit 33 occurs because the cut 32 begins at notch 40 and extends to the end of the cut at 42, creating the upper portion 33, which inherently has the flexibility and resiliency to move in and out of the teeth 36 as the hub 9 is rotated in a counter-clockwise direction.

Figure 7:
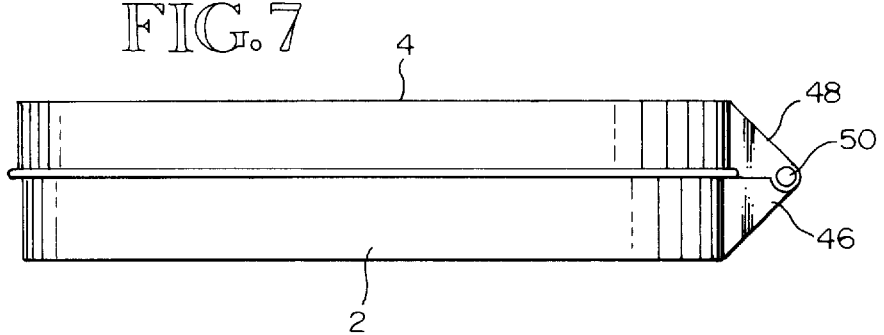
FIGS. 7, 8 and 9 each depict alternate hinge-cover combinations for the present invention.
Figure 8:
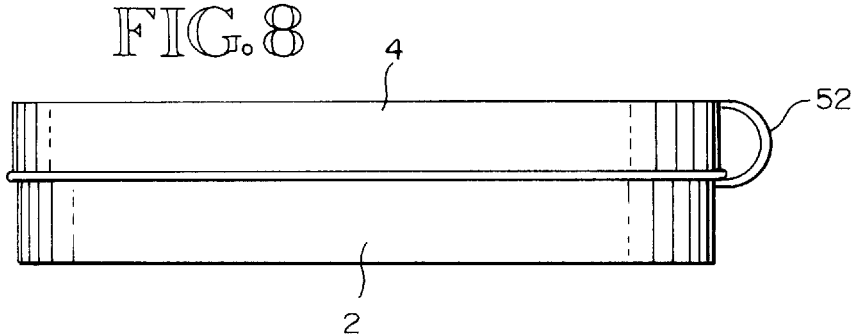
Figure 9:
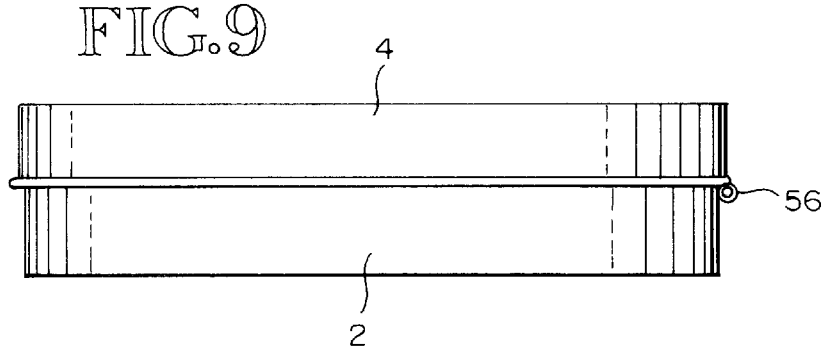

FIGS. 7, 8 and 9 disclose the current invention with three possible securement hinges between the main case or shell 2 and the upper cover 4. As seen in FIG. 7, both the elements 2 and 4 have outwardly extending structural elements 46, 48 which are pinned together by a hinge pin 50.

FIG. 8 discloses a resilient, integral plastic strap 52 connecting the lower element 2 and the upper element 4.

FIG. 9 discloses a downwardly extending horizontal, cylindrical element 56 connected to the upper portion 4, which in a standard hinge element has mating cylindrical elements connected at the bottom 2, and the two cylindrical mating elements are connected by a hinge pin to form the hinge.

Thus as can be seen, the current invention discloses a relatively inexpensive, easy to use storage container, wherein a plurality of hooks and their attached leaders may be stored and easily removed when needed.

What is claimed is:

1. A hook and leader dispenser, comprising:

a relatively short, upwardly open, closed bottom cylindrical case having an upper edge and including a central, upwardly projecting cylindrical hub and an inwardly projecting lip along the upper edge of the case; and a spool comprising a circular floor surrounding a downwardly open, upwardly extending, central hollow cylindrical member with a slightly larger diameter and lesser height than the hub such that the spool turns freely about said hub with minimal contact between the floor and the bottom of the case, said spool further comprising an exterior cylindrical wall spaced inwardly from the wall of the case, said wall having radially outwardly extending flanges at the top and bottom thereof, the upper flange being of a larger diameter than the opening defined by the lip, radial dividers extending from the hollow cylindrical member to the cylindrical wall dividing the space into sections and an opening within each section extending through the wall and upper flange whereby a hook may be placed in a section and its leader extending outwardly through the opening to be wound about the exterior cylindrical wall of the spool.

2. A dispenser as in claim 1, wherein each section includes a post distal from the opening upon which a plurality of hooks may be stacked.

3. A dispenser as in claim 1, wherein the opening in each section extends downwardly from the top of the exterior wall and terminates at an axial position on the wall so leaders are axially separated when wound about the wall.

4. A container as in claim 1, and further including means restricting rotation of the spool to a single direction.

* * * * *